(12) United States Patent
Xu et al.

(10) Patent No.: US 10,941,619 B2
(45) Date of Patent: Mar. 9, 2021

(54) METAL MATRIX COMPOSITIONS AND METHODS FOR MANUFACTURING SAME

(71) Applicant: Seed Technologies Corp., Ltd., Hunan (CN)

(72) Inventors: Yuehua Xu, Hunan (CN); Yuan Yuan, Hunan (CN); Bin Liu, Hunan (CN)

(73) Assignee: SEED TECHNOLOGIES CORP., LTD., Hunan (CN)

( * ) Notice: Subject to any disclaimer, the term of this patent is extended or adjusted under 35 U.S.C. 154(b) by 836 days.

(21) Appl. No.: 15/111,851

(22) PCT Filed: Apr. 25, 2016

(86) PCT No.: PCT/CN2016/080123
§ 371 (c)(1),
(2) Date: Jul. 15, 2016

(87) PCT Pub. No.: WO2017/096748
PCT Pub. Date: Jun. 15, 2017

(65) Prior Publication Data
US 2018/0038167 A1    Feb. 8, 2018

Related U.S. Application Data

(63) Continuation of application No. PCT/CN2016/072748, filed on Jan. 29, 2016.

(30) Foreign Application Priority Data

Dec. 7, 2015    (CN) .......................... 201510887962.8

(51) Int. Cl.
*E21B 10/46* (2006.01)
*C22C 32/00* (2006.01)
(Continued)

(52) U.S. Cl.
CPC ............ *E21B 10/46* (2013.01); *B22F 3/1055* (2013.01); *B23K 15/0006* (2013.01);
(Continued)

(58) Field of Classification Search
None
See application file for complete search history.

(56) References Cited

U.S. PATENT DOCUMENTS

| 8,025,112 B2 | 9/2011 | Mirchandani et al. |
| 2004/0060742 A1 | 4/2004 | Kembaiyan et al. |

(Continued)

FOREIGN PATENT DOCUMENTS

| CA | 2442198 A1 | 3/2004 |
| CA | 2564082 A1 | 11/2005 |

(Continued)

OTHER PUBLICATIONS

I. Gibson, D.W. Rosen, and B. Stucker, Additive Manufacturing Technologies, DOI 10.1007/978-1-4419-1120-9_5, # Springer Science þ Business Media, LLC 2010 Chapter 5 (Year: 2010).*

(Continued)

*Primary Examiner* — Anthony J Zimmer
*Assistant Examiner* — Michael J Kachmarik
(74) *Attorney, Agent, or Firm* — Conley Rose, P.C.

(57) ABSTRACT

An additive manufacturing method for making a metal matrix composite component includes melting a powdered mixture with an electron beam. The powdered mixture comprises powdered tungsten carbide in an amount of 45 wt % to 72 wt % of the powdered mixture and a powdered binder in an amount of 28 wt % to 55 wt % of the powdered mixture. The powdered binder comprises boron, silicon, and nickel.

20 Claims, 5 Drawing Sheets

(51) Int. Cl.
| | |
|---|---|
| F04D 29/22 | (2006.01) |
| B22F 3/105 | (2006.01) |
| C22C 29/00 | (2006.01) |
| B23K 15/00 | (2006.01) |
| B23K 15/06 | (2006.01) |
| B33Y 10/00 | (2015.01) |
| B33Y 70/00 | (2020.01) |
| B28B 1/00 | (2006.01) |
| C22C 29/08 | (2006.01) |
| B22F 5/00 | (2006.01) |
| B33Y 80/00 | (2015.01) |
| E21B 10/54 | (2006.01) |
| B23K 15/02 | (2006.01) |
| F04D 29/02 | (2006.01) |
| F16L 9/14 | (2006.01) |
| B23K 101/20 | (2006.01) |
| B23K 101/00 | (2006.01) |
| B23K 103/00 | (2006.01) |

(52) U.S. Cl.
CPC ...... *B23K 15/0086* (2013.01); *B23K 15/0093* (2013.01); *B23K 15/02* (2013.01); *B23K 15/06* (2013.01); *B28B 1/001* (2013.01); *B33Y 10/00* (2014.12); *B33Y 70/00* (2014.12); *C22C 29/005* (2013.01); *C22C 29/08* (2013.01); *C22C 32/0047* (2013.01); *F04D 29/2227* (2013.01); *B22F 2005/001* (2013.01); *B23K 2101/001* (2018.08); *B23K 2101/20* (2018.08); *B23K 2103/52* (2018.08); *B33Y 80/00* (2014.12); *E21B 10/54* (2013.01); *F04D 29/026* (2013.01); *F04D 29/22* (2013.01); *F05D 2230/30* (2013.01); *F05D 2300/177* (2013.01); *F05D 2300/2263* (2013.01); *F16L 9/14* (2013.01); *Y02P 10/25* (2015.11)

(56) References Cited

U.S. PATENT DOCUMENTS

| | | | |
|---|---|---|---|
| 2010/0276208 A1* | 11/2010 | Sue | C22C 29/08 175/374 |
| 2014/0087210 A1* | 3/2014 | Keane | B22F 3/02 428/810 |
| 2014/0271318 A1* | 9/2014 | Zheng | B22F 7/008 419/7 |
| 2014/0284114 A1 | 9/2014 | Mirchandani et al. | |
| 2015/0060042 A1 | 3/2015 | Shilpiekandula et al. | |
| 2016/0375493 A1* | 12/2016 | Stoyanov | C22C 29/08 419/6 |
| 2017/0107764 A1* | 4/2017 | Cook, III | B22F 7/062 |
| 2018/0161874 A1* | 6/2018 | Nuechterlein | C22C 21/04 |

FOREIGN PATENT DOCUMENTS

| | | |
|---|---|---|
| CA | 2601196 A1 | 9/2006 |
| CA | 2702658 A1 | 10/2010 |
| CA | 2832615 A1 | 5/2014 |
| CA | 2980122 A1 | 10/2016 |
| CN | 101198762 A | 6/2008 |
| CN | 102187048 A | 9/2011 |
| CN | 104195550 A | 12/2014 |
| CN | 104388875 A | 3/2015 |
| CN | 105089508 A | 11/2015 |
| CN | 105189405 A | 12/2015 |
| CN | 105458256 A | 4/2016 |
| WO | 2015/030879 A2 | 3/2015 |

OTHER PUBLICATIONS

Chinese Office Action dated Aug. 27, 2018, for Chinese Application No. 201680000667.9 (7 p.).
English Translation of Chinese Office Action dated Aug. 27, 2018, for Chinese Application No. 201680000667.9 (7 p.).
Chinese Office Action dated Mar. 22, 2019, for Chinese Application No. 201680000667.9 (8 p.).
English Translation of Chinese Office Action dated Mar. 22, 2019, for Chinese Application No. 201680000667.9 (14 p.).
Canadian Office Action dated Nov. 2, 2018, for Canadian Application No. 2,939,609 (6 p.).
Canadian Office Action dated Dec. 13, 2017, for Canadian Application No. 2,939,609.
Russian Office Action dated Feb. 5, 2018, for Russian Application No. 2016129701 (8 p.).
English Translation of Russian Office Action dated Feb. 5, 2018, for Russian Application No. 2016129701 (4 p.).
Chinese Office Action dated Feb. 16, 2017, for Chinese Application No. 201510887962.8 (4 p.).
English Translation of Chinese Office Action dated Feb. 16, 2017, for Chinese Application No. 201510887962.8 (7 p.).
PCT/CN2016/080123 International Search Report and Written Opinion dated Sep. 14, 2016 (13 p.).
Canadian Office Action dated Sep. 30, 2019, for Canadian Application No. 2,939,609 (4 p.).
Sue, J.A. et al., "Improved Hardfacing for Drill Bits and Drilling Tools," Thermal Spray: Global Solutions for Future Application, International Thermal Spray Conference & Exposition, May 3-5, 2010 (8 p).

\* cited by examiner

METAL MATRIX COMPOSITIONS AND METHODS FOR MANUFACTURING SAME

CROSS-REFERENCE TO RELATED APPLICATIONS

This application is a 35 U.S.C. § 371 national stage application of PCT/CN2016/080123 filed Apr. 25, 2016 and entitled, "Metal Matrix Compositions and Methods for Manufacturing Same," which claims benefit of Chinese patent application Serial No. 201510887962.8 filed Dec. 7, 2015, and entitled "A Metal Matrix Composite and Its Additive Manufacturing Method," each of which is hereby incorporated herein by reference in its entirety. This application also claims benefit of PCT/CN2016/072748 filed Jan. 29, 2016, and entitled "A Metal Matrix Composite and Its Additive Manufacturing Method," which is hereby incorporated herein by reference in its entirety.

STATEMENT REGARDING FEDERALLY SPONSORED RESEARCH OR DEVELOPMENT

Not applicable.

BACKGROUND

The disclosure relates generally to metal matrix compositions and methods for manufacturing such metal matrix compositions. More particularly, the disclosure relates to additive manufacturing methods for making metal matrix compositions and components made of such metal matrix compositions.

The metal matrix composites (MMCs) are composite materials formed of two or more constituents with at least one of the constituents being a metal. In general, the other constituent(s) can be metals or non-metals such as a ceramics or organic compounds.

MMCs are made by dispersing and embedding a reinforcing material into a continuous metal matrix. The metal matrix is often a relatively low-weight metal such as aluminum, magnesium, or titanium that provides a compliant support for the reinforcing material. In some high-temperature applications, the metal matrix is often made of cobalt or cobalt-nickel alloy. The reinforcing material can function to enhance the strength, wear resistance, or thermal conductivity of the metal matrix. For example, tungsten carbide (WC) can be used as a reinforcing material in an MMC to enhance the wear, erosion, corrosion, and impact resistance of the metal matrix within which it is embedded. MMCs utilizing tungsten carbide as a reinforcing material are employed in a variety of industrial applications and components.

BRIEF SUMMARY OF THE DISCLOSURE

Embodiments described herein include additive manufacturing methods for making metal matrix composite components. In one embodiment, an additive manufacturing method for making a metal matrix composite component comprises melting a powdered mixture with an electron beam. The powdered mixture comprises powdered tungsten carbide in an amount of 45 wt % to 72 wt % of the powdered mixture and a powdered binder in an amount of 28 wt % to 55 wt % of the powdered mixture. The powdered binder comprises boron, silicon, and nickel.

Embodiments described herein also include metal matrix composite compositions. In one embodiment a metal matrix composite composition comprises tungsten carbide in an amount of 45 wt % to 72 wt % of the composition. In addition, the metal matrix composite composition comprises a binder in an amount of 28 wt % to 55 wt % of the composition. The binder comprises boron in an amount of 0.5 wt % to 6.0 wt % of the binder. The binder also comprises silicon in an amount of 2.0 wt % to 6.0 wt % of the binder. Further, the binder comprises nickel in an amount of at least 70 wt % of the binder.

Embodiments described herein further include metal matrix composite components. In one embodiment, an earth-boring drill bit for drilling a borehole in an earthen formation comprises a bit body made of a metal matrix composite. The metal matrix composite comprises tungsten carbide in an amount of 45 wt % to 72 wt % of the composition. The metal matrix composite also comprises a binder in an amount of 28 wt % to 55 wt % of the composition. The binder comprises boron, silicon, and nickel.

Embodiments described herein comprise a combination of features and advantages intended to address various shortcomings associated with certain prior devices, systems, and methods. The foregoing has outlined rather broadly the features and technical advantages of the invention in order that the detailed description of the invention that follows may be better understood. The various characteristics described above, as well as other features, will be readily apparent to those skilled in the art upon reading the following detailed description, and by referring to the accompanying drawings. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
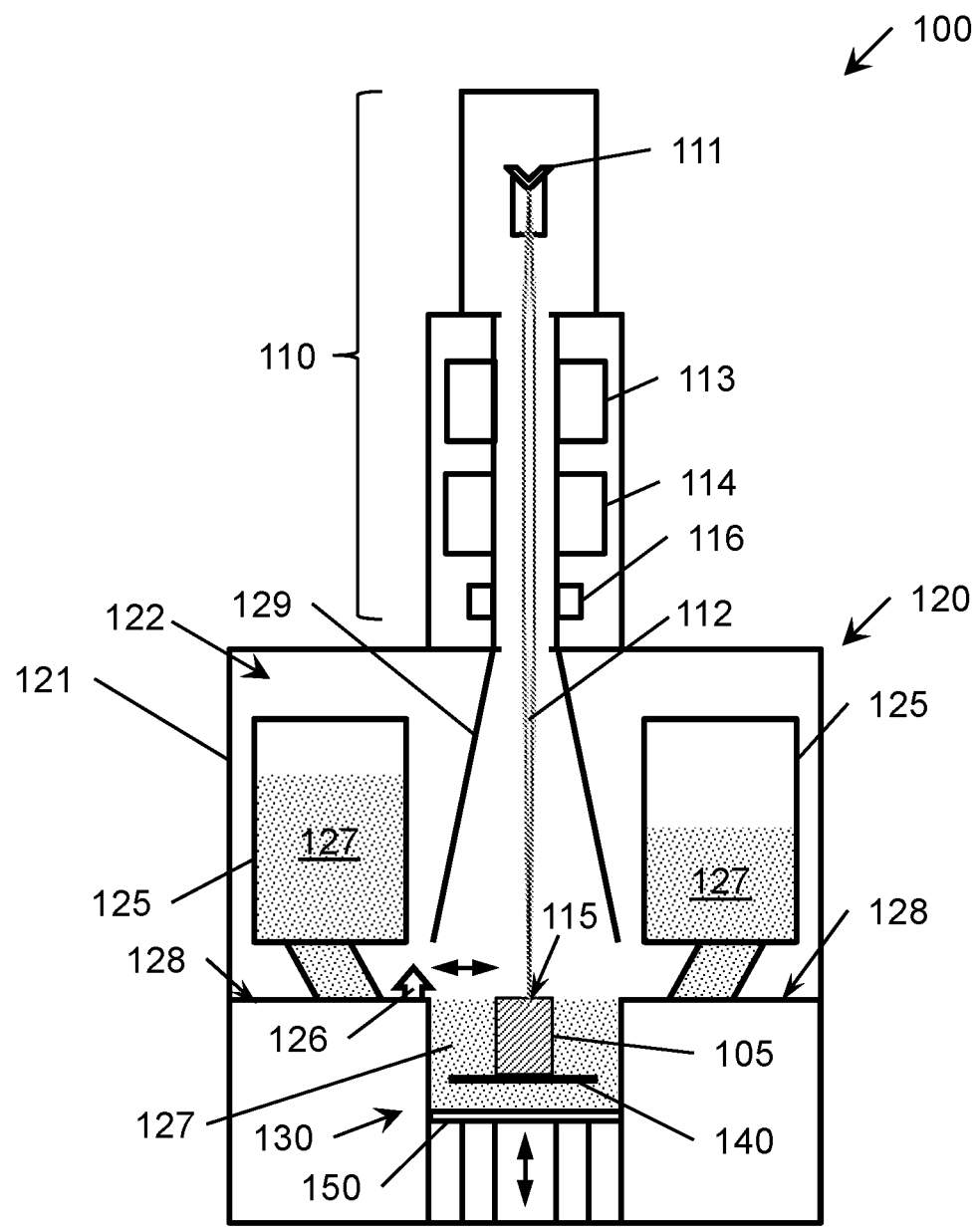
FIG. 1 is a schematic view of an embodiment of an electron beam melting (EBM) machine for manufacturing embodiments of metal matrix composite components in accordance with the principles described herein.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a part), while the terms "radial" and "radially" generally mean perpendicular to the central axis. For instance, an axial distance refers to a distance measured along or parallel to the central axis, and a radial distance means a distance measured perpendicular to the central axis. Still further, as used herein, the term "component" may be used to refer to a contiguous, single-piece or monolithic structure, part, or device. It is to be understood that a component may be used alone or as part of a larger system or assembly.

An earth-boring drill bit is typically mounted on the lower end of a drill string and is rotated by rotating the drill string at the surface and/or by a downhole motor. With weight applied to the drill string, the rotating bit engages the formation and drills a borehole through the formation.

Fixed cutter bits, also known as rotary drag bits, are a type of earth-boring drill bit that includes a bit body having a plurality of blades angularly spaced about a bit face and a plurality of cutter elements mounted on the blades. In general, the bit body can be made of steel or a hard metal cast matrix. A steel bit body is machined from a steel block or cylinder (i.e., via a material subtractive manufacturing process). A hardfacing material may subsequently be applied to the outer surface of the steel bit body via thermal spraying process before the cutter elements are secured in mating pockets on the blades via brazing. A matrix bit body is formed by a powdered metallurgical process. In particular, powdered tungsten carbide and a binder material such as Cu—Ni—Mn—Zn, Cu—Zn, or Cu—Ni—Mn—Sn are placed in a carbon/graphite mold. Typically, the powdered material placed in the mold (i.e., the tungsten carbide and the binder) has a composition comprising 50 wt % to 80 wt % tungsten carbide and 20 wt % to 50 wt % binder. The mold is then heated in a furnace to a temperature greater than 2,000° F. (greater than 1,100° C.) for about one hour to allow the binder material to infiltrate the tungsten carbide and form the solid metal matrix bit body. Next, the mold with the metal matrix bit body disposed therein is directionally cooled to room temperature, and then the mold is removed from the bit body by breaking, chiseling, and grinding the mold. This process for manufacturing metal matrix bit bodies can take more 24 hours to perform.

The cutter elements include an elongate and generally cylindrical tungsten carbide support member that is received and secured in a pocket formed in the surface of one of the several blades of the bit body (steel or metal matrix). A hard cutting layer of polycrystalline diamond ("PD") or other superabrasive material (e.g., cubic boron nitride, thermally stable diamond, polycrystalline cubic boron nitride, etc.) is secured to the exposed end of the support member.

During drilling operations, a drill bit is subjected to extreme abrasive wear, impact loads, and thermal stresses. In some cases, the drill bit may also be exposed to corrosive fluids. Consequently, drill bits may experience severe wear, corrosion, and physical damage while drilling. For example, the bit body (steel or metal matrix) may be chipped or cracked due via impact with hard formations and rock. Sufficient damage to a drill bit may detrimentally reduce it cutting effectiveness and rate of penetration (ROP). In such cases, it may be necessary to change the drill bit by pulling the entire drill string, which may be thousands of feet long, from the borehole section-by-section. Once the drill string has been retrieved and the new bit installed, the bit must be lowered to the bottom of the borehole on the drill string, which again must be constructed section-by-section. This process, referred to as a "trip" of the drill string, requires considerable time, effort and expense.

A submersible pump is a pump having a sealed motor, which enables the pump to be completely submerged in the fluid to be pumped. Submersible pumps are often used in "artificial lift" applications to pump fluids (e.g., oil) in a borehole to the surface. Many submersible pumps are multistage centrifugal pumps, where each stage includes an impeller and a diffuser that directs fluid flow to the next stage of the pump. Well fluids pumped by submersible pumps typically comprise liquids containing solid particles entrained therein. The well fluids may also include corrosive liquids and/or gases. Consequently, during downhole pumping operations, the impellers experience abrasive wear, erosion, and may be exposed to corrosive fluids. As a result, continuous and extended rotation of the impellers in such well fluids may lead to abrasive wear, erosion, and corrosion, which may detrimentally alter the geometry of the impeller and ultimately shorten the operating life of the submersible pump.

Elbows are provided along conduits (e.g., pipelines) that transport fluids to change the direction of flow fluids. In some applications, the fluids flowing through conduits and elbows contain abrasive solid particles and/or corrosive fluids. As a result, flow of such fluids through an elbow over an extended period of time may lead to abrasive wear, erosion, and corrosion on the inner surfaces of the elbow, which may undesirably necessitate repair or replacement of the elbow.

As described above, many components and devices used in industrial processes such as earth-boring drill bits, pump impellers, and elbows along fluid conduits are subjected to impact loads, abrasive materials, corrosive fluids, or combinations thereof. Over time, such harsh operating conditions can leads to abrasive wear, erosion, corrosion, and damage to the particular component or device. Accordingly, it is desirable to employ materials and manufacturing techniques to produce components and devices that exhibit increased impact strength, wear resistance, and corrosion resistance to offer the potential to improve the operating lifetime of the components and devices.

One conventional approach to dealing with such challenges has focused on the use of carbide materials. For example, conventional earth-boring drill bits, submersible pump impellers, and elbows used along fluid conduits are often made of a steel alloy base material with one or more insert(s) of cemented carbide embedded in the surfaces that experience the harshest conditions and are most prone to damage. However, sufficient wear or damage to the base steel alloy surrounding the inserts can result in the loss of such inserts. Another approach to dealing with such challenges has focused on the application of hard metal coatings to the underlying base material to effectively protect the underlying base material. Typically, the coating is applied to the surfaces that experience the harshest conditions and are most prone to damage. However, differences in the physical properties of the underlying base material and the coating (e.g., differences in the coefficients of thermal expansion) can lead to de-bonding or cracking of the coating, which may ultimately lead to exposure of the underlying base material.

With particular regard to earth-boring drill bits having metal matrix bit bodies, reinforced tungsten carbide metal matrix composites has been the focus of most research and development aimed at enhancing impact strength, wear resistance, and corrosion resistance. As previously described, the powdered metallurgical process commonly used to produce such metal matrix bit bodies employs a powdered mixture of a binder material and tungsten carbide. The powdered mixture is pressed or injected in a mold and then sintered into a final product. Due to the use of a mold, the powdered mixtures limited ability to flow, and other constraints, it is difficult to produce components having complex shapes using the conventional powder metallurgical manufacturing processes. In addition, components produced using such conventional powder metallurgical manufacturing processes may include defects or develop cracks due to uneven heating during sintering or uneven cooling after sintering. Such defects and cracks may detrimentally reduce the wear resistance, erosion resistance, corrosion resistance, and impact strength of the produced component.

As will be described in more detail below, embodiments of metal matrix composite compositions and manufacturing methods disclosed herein offer the potential for materials and components with enhanced impact strength, wear resistance, erosion resistance, corrosion resistance, and operating lifetime. Such potential benefits may be achieved without the use of embedded inserts or the application of coatings. In addition, embodiments described herein also offer the potential to produce components having complex shapes and geometries via additive manufacturing methods that combine the use of powdered metallurgy and electron beam melting technologies.

Embodiments of manufacturing methods described herein utilize electron beam additive manufacturing techniques, also referred to as "electron beam melting" or simply "EBM." In general, an EBM additive manufacturing process is a 3D printing technique that produces dense metal (or metal matrix composite) component by consolidating, via controlled and selective melting, a metal powder layer-by-layer into a solid mass using an electron beam as a heat source. The EBM additive manufacturing process is performed in and controlled by an EBM machine that reads data from a 3D CAD model, lays down successive layers of the powdered metal, and melts each successive layer (one at a time) with an electron beam to build up (i.e., "print") the metal component layer-by-layer. Each layer is melted to the exact geometry defined by the 3D CAD model, and thus, enables the production of components with very complex geometries without tool, fixtures, or molds, and without producing any waste material. The EBM additive manufacturing process is performed under vacuum (i.e., at a pressure less than atmospheric) to enable use of metals and materials that exhibit a high affinity for oxygen (e.g., titanium), and at elevated temperatures. Examples of EBM machines that can perform EBM manufacturing processes include, without limitation, the Arcam A2X, the Arcam Q10, and the Arcam Q20, each available from Arcam AB of Molndal, Sweden.

Referring briefly to FIG. 1, an embodiment of an EBM machine 100 is shown. In general, EBM machine 100 can be used in embodiments of manufacturing methods disclosed herein such as additive manufacturing method 200 described in more detail below and shown in FIG. 2. In FIG. 1, EBM machine 100 is shown manufacturing an exemplary component 105. In this embodiment, EBM machine 100 includes an electron beam column 110, a vacuum chamber 120 coupled to column 110, a plurality of hoppers 125 disposed in chamber 120, a build tank 130 disposed in chamber 120, a powder distribution device 126 disposed in chamber 120 between hoppers 125 proximal the top of build tank 130, a start plate 140 disposed in tank 130, and a build platform 150 moveably disposed in tank 130. Electron beam column 110 includes a filament 111 that produces an electron beam 112, a stigmator 113 to controllably reduce astigmatism of electron beam 112, a focus lens or coil 114 to converge the electrons in beam 112 radially to form a focal spot 115, and a deflection lens or coil 116 to change the direction or path of electron beam 112 and associated focal spot 115.

Vacuum chamber 120 includes an outer housing 121 and an inner cavity 122 disposed within housing 121. A vacuum (i.e., pressure less than atmospheric or ambient pressure) can be controllably applied to cavity 122. Hoppers 125 disposed in cavity 122 store and feed a powdered mixture 127 used to form component 105. As will be described in more detail below, the powdered mixture 127 is a homogenous mixture of a plurality of selected powdered source or raw materials. Accordingly, mixture 127 may also be referred to herein as powdered mixture 127 of selected source materials. Hoppers 125 feed the powdered mixture 127 onto a horizontal planar surface 128 in chamber 120. A heat shield 129 extends downward from column 110 into cavity 122 between electron beam 112 and hoppers 125 to protect hoppers 125 and the powdered mixture 127 therein from electron beam 112.

Referring still to FIG. 1, build tank 130 is a receptacle or cavity adjacent to and extending downwardly from surface 128. Tank 130 is laterally positioned between hoppers 125. In this embodiment, powder distribution device 126 is a rake that moves transversely within chamber 120 across surface 128 and the open top of build tank 130 (i.e., to the left and to the right in FIG. 2) to distribute the powdered mixture 127 fed by hoppers 125 across build tank 130. Platform 150 is moveably disposed in tank 130. In particular, platform 150 can move vertically up and down within tank 130 to effectively decrease or increase the usably volume of tank 130. In general, the dimensions tank 130 define the maximum dimensions of the component 105 that can be manufactured with EBM machine 100. In embodiments described herein, build tank 130 preferably has a horizontal length greater than 200 mm, a horizontal width greater than 200 mm, and a vertical height (with platform 150 in its lowermost position) greater than 380 mm. A start plate 140 is positioned within tank 130 above platform 150 and functions as a sacrificial base onto which component 105 is built.

A control system (e.g., computer controlled system) and associated equipment (e.g., actuators, hardware, pumps, sensors, etc.) (not shown in FIG. 1) are employed to control the operation of EBM machine 100. A power supply system (not shown) provides power to the control system, EBM machine 100, and related equipment.

To manufacture exemplary component 105, start plate 140 is positioned at the top of build tank 130 by raising platform 150 and chamber 120 is evacuated. Next, hopper(s) 125 feed the powdered mixture 127 onto the surface 128 and rake 126 distributes a layer of the powdered mixture 127 onto start plate 140. The control system (not shown) of EBM machine 100 reads data from a 3D CAD model to direct and control the operation of electron beam 112 to selectively and controllably melt the layer of the powdered mixture 127 to the exact geometry defined by the 3D CAD model. The portion of the powdered mixture 127 that is melted with electron beam 112 becomes a solid mass on start plate 140. The platform 150 is then lowered approximately the thickness of the next layer of powdered mixture 127 to be added to the previously melted layer, rake 126 distributes the next layer of the powdered mixture 127 fed from hopper(s) 125 onto the previously melted layer, and the process is repeated to build-up component 105 layer-by-layer. During the manufacturing process, the electron beam 112 delivers sufficient power to the interface between beam 112 and powdered mixture at focal spot 115, and is controllably moved linearly back-and-forth across the powdered mixture 127 at a suitable speed to sufficiently melt the layer of the powdered mixture 127.

The powdered mixture 127 moved into tank 130 by device 126 that is not melted by electron beam 112 to form part of component 105 can collect in tank 130 around start plate 140 and component 150. Such excess powdered mixture 127 can be removed from tank 130 after manufacture of component 105 and recycled for future use.

Figure 2:
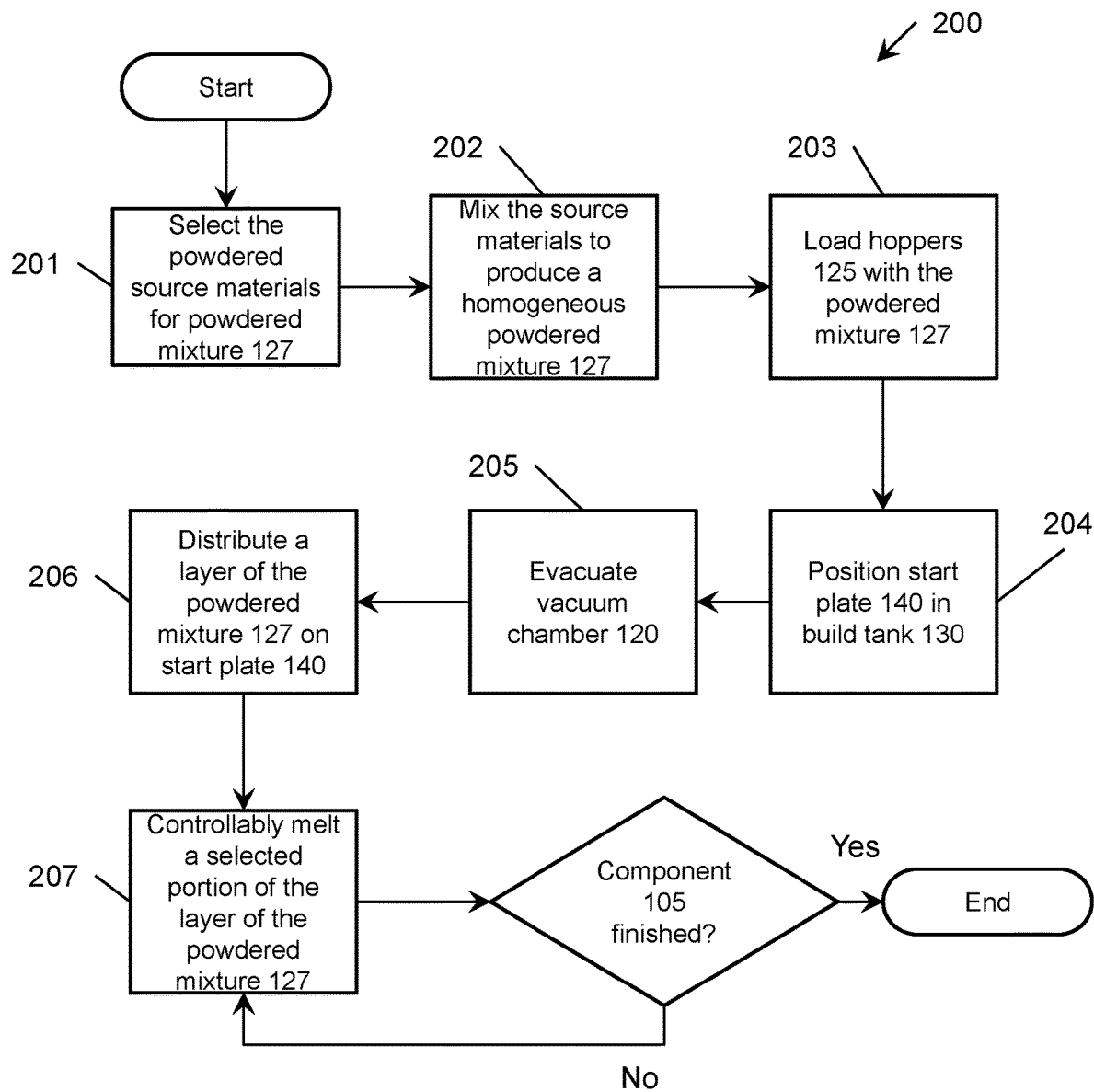
FIG. 2 is a flowchart illustrating an embodiment of a method for manufacturing a metal matrix composite component in accordance with principles described herein.

Referring now to FIG. 2, an embodiment of a method 200 for manufacturing a metal matrix composite component is shown. In this embodiment, method 200 is an electron beam additive manufacturing process. For purposes of clarity, method 200 is described below within the context of manufacturing exemplary metal matrix composite component 105 using EBM machine 100, both as previously described. However, in general, method 200 can be used to manufacture (via electron beam additive manufacturing techniques) any metal matrix composite component, and further, EBM machines or systems other than EBM machine 100 can be used to perform embodiments of method 200.

Beginning in block 201, method 200 includes selecting the source materials or ingredients that are mixed together to form the powdered mixture 127, which is ultimately melted into a single mass to form component 105. As previously described, method 200 is an EBM additive manufacturing process, and thus, the source materials are in a powdered form suitable for forming powdered mixture 127 for use with EBM machine 100.

In general, the type and relative amounts of the source materials determines the final composition of the component manufactured by the EBM additive manufacturing process. In other words, the composition of the component manufactured by the EBM additive manufacturing process (e.g., component 105 manufactured via method 200) is the same as the composition of the powdered mixture 127, which is defined by the type and relative amounts of the source materials. In embodiments described herein, the manufactured component (e.g., component 105) is formed of a metal matrix composite having a composition comprising tungsten carbide uniformly distributed throughout a binder. Accordingly, the source materials comprise powdered tungsten carbide and a powdered binder. In embodiments described herein, the source materials preferably consist essentially of or consist of powdered tungsten carbide and powdered binder. As used herein, the phrases "consist(s) of" and "consisting of" are used to refer to exclusive components of a composition, meaning only those expressly recited components are included in the composition; whereas the phrases "consist(s) essentially of" and "consisting essentially of" are used to refer to the primary components of a composition, meaning that only small or trace amounts of components other than the expressly recited components (e.g., impurities, byproducts, etc.) may be included in the composition. For example, a composition consisting of X and Y refers to a composition that only includes X and Y, and thus, does not include any other components; and a composition consisting essentially of X and Y refers to a composition that primarily comprises X and Y, but may include small or trace amounts of components other than X and Y. In embodiments described herein, any such small or trace amounts of components other than those expressly recited following the phrase "consist(s) essentially of" or "consisting essentially of" preferably represent less than 5.0 wt % of the composition, more preferably less than 4.0 wt % of the composition, even more preferably less than 3.0 wt % of the composition, and still more preferably less than 1.0 wt % of the composition.

In embodiments described herein, the source materials preferably comprise powdered tungsten carbide in an amount of 45 wt % to 72 wt % of the powdered mixture 127 and a powdered binder in an amount of 28 wt % to 55 wt % of the powdered mixture 127 (i.e., the balance of the powdered mixture 127 is powdered binder); more preferably tungsten carbide in an amount of 50 wt % to 65 wt % of the powdered mixture 127 and powdered binder in an amount of 35 wt % to 50 wt % of the powdered mixture 127 (i.e., the balance of the powdered mixture 127 is powdered binder); and even more preferably tungsten carbide in an amount of 55 wt % to 60 wt % of the powdered mixture and powdered binder in an amount of 40 wt % to 45 wt % of the powdered mixture 127 (i.e., the balance of the powdered mixture is powdered binder).

In embodiments described herein, the powdered tungsten carbide can include spherical cast $WC/W_2C$, angular cast $WC/W_2C$, macro-crystalline WC, or combinations thereof. In general, spherical cast $WC/W_2C$ provides greater toughness than macro-crystalline WC and angular cast $WC/W_2C$, spherical cast $WC/W_2C$ and angular cast $WC/W_2C$ have a greater hardness than macro-crystalline WC, and spherical cast $WC/W_2C$ exhibits reduced susceptibility to stress concentrations. Therefore, to optimize the hardness and toughness properties of the manufactured component, while reducing the potential for stress concentrations, spherical cast $WC/W_2C$ is preferred. Accordingly, in embodiments described herein, at least 50 vol % of the total powdered tungsten carbide in the source materials is preferably spherical cast $WC/W_2C$, more preferably at least 60 vol % of the total powdered tungsten carbide (vol %) in the source materials is preferably spherical cast $WC/W_2C$, even more preferably at least 70 vol % of the total powdered tungsten carbide (vol %) in the source materials is preferably spherical cast $WC/W_2C$, and still more preferably at least 80 vol % of the total powdered tungsten carbide (vol %) in the source materials is preferably spherical cast $WC/W_2C$.

In embodiments described herein, the powdered tungsten carbide preferably has a powder mesh size (US Standard Sieve) of 50 mesh to 400 mesh (i.e., each of the tungsten carbide particles preferably has a size of 37.0 μm to 300.0 μm); more preferably 80 mesh to 400 mesh (i.e., each of the tungsten carbide particles preferably has a size of 37.0 μm to 180.0 μm); even more preferably 150 mesh to 350 mesh (i.e., each of the tungsten carbide particles preferably has a size of 43 μm to 100.0 μm); and still more preferably 200 mesh to 300 mesh (i.e., each of the tungsten carbide particles preferably has a size of 50.0 μm to 74.0 μm).

In embodiments described herein, the powdered binder preferably has a powder mesh size (US standard Sieve) of 60 mesh to 400 mesh (i.e., each of the particles in the binder has a size of 38.0 μm to 250.0 μm), more preferably 70 mesh to 325 mesh (i.e., each of the particles in the binder has a size of 45.0 μm to 212.0 μm), still more preferably 150 mesh to 350 mesh (i.e., each of the particles in the binder has a size of 43 μm to 100.0 μm), and even more preferably 200 mesh to 300 mesh (i.e., each of the particles in the binder has a size of 50.0 μm to 75.0 μm).

In embodiments described herein, the powdered binder source material is preferably a powdered nickel-based binder. More specifically, in embodiments described herein, the powdered binder source material preferably has a composition comprising boron (B), silicon (Si), and nickel (N). In addition, the powdered binder is preferably a relatively low melting point nickel-based binder. In particular, for use with EBM additive manufacturing processes, the powdered nickel-based binder preferably has a melting point less than 1250° C., more preferably between 600° C. and 1200° C., more preferably between 650° C. and 1100° C., even more preferably between 800° C. and 1000° C.

In embodiments described herein, the powdered binder preferably has a composition comprising Ni in an amount greater than 70 wt % of the powdered binder. More specifically, in embodiments described herein, the powdered binder preferably has a composition comprising B in an amount of 0 wt % to 6.0 wt % of the powdered binder, Si in an amount of 0 wt % to 6.0 wt % of the powdered binder, and Ni in an amount of at least 70 wt % of the powdered binder; more preferably the powdered binder has a composition comprising B in an amount of 0.5 wt % to 6.0 wt % of the powdered binder, Si in an amount of 2.0 wt % to 6.0 wt % of the powdered binder, and Ni in an amount of at least 70 wt % of the powdered binder; even more preferably the powdered binder has a composition comprising B in an amount of 1.0 wt % to 3.0 wt % of the powdered binder, Si in an amount of 2.5 wt % to 4.5 wt % of the powdered binder, and Ni in an amount of at least 90 wt % of the powdered binder; and still more preferably the powdered binder has a composition comprising B in an amount of 1.5 wt % to 2.5 wt % of the powdered binder, Si in an amount of 3.0 wt % to 4.0 wt % of the powdered binder, and Ni making up the entire balance of the powdered binder.

In some embodiments, other powdered materials such as chromium (Cr), iron (Fe), cobalt (Co), copper (Cu), molybdenum (Mo), phosphorus (P), aluminum (Al), niobium (Nb), titanium (Ti), manganese (Mn), or combinations thereof may be included in the powdered binder source material. In such embodiments including elements in addition to or as an alternative to one or more of B, Si, or Ni, the powdered binder preferably comprises Cr in an amount less than or equal to 23 wt % of the powdered binder, and more preferably an amount less than or equal to 7.0 wt % of the powdered binder; Fe in an amount of less than or equal to 3.0 wt % of the powdered binder; Co in an amount less than or equal to 22.0 wt % of the powdered binder; Cu in an amount less than or equal to 5.5 wt % of the powdered binder; Mo in an amount less than or equal to 1.5 wt % of the powdered binder; P in an amount less than or equal to 2.0 wt % of the powdered binder; Al in an amount less than or equal to 0.4 wt %; Nb in an amount les than or equal to 4.15 wt %; Ti in an amount less than or equal to 0.05 wt %. The compositions of select exemplary powdered binders are provided in Table 1 below.

TABLE 1

| Exemplary powdered binder | Nominal Composition (wt. %) | | | | | | | | | | | | | Melting Point (° C.) |
|---|---|---|---|---|---|---|---|---|---|---|---|---|---|---|
| | Cr | Fe | Si | B | Co | Cu | Mo | P | Al | Nb | Ti | Mn | Ni | |
| 1 | 7.0 | 3.0 | 4.2 | 3.0 | 0 | 0 | 0 | 0 | 0 | 0 | 0 | 0 | Balance | 999 |
| 2 | 0 | 0 | 4.5 | 3.0 | 0 | 0 | 0 | 0 | 0 | 0 | 0 | 0 | Balance | 1030 |
| 3 | 0 | 0 | 3.5 | 1.8 | 0 | 0 | 0 | 0 | 0 | 0 | 0 | 0 | Balance | 1066 |
| 4 | 0 | 0 | 3.5 | 2.8 | 22.0 | 0 | 0 | 0 | 0 | 0 | 0 | 0 | Balance | 1129 |
| 5 | 3 | 0 | 2.5 | 1.0 | 0 | 5.5 | 1.5 | 2.0 | 0 | 0 | 0 | 0 | Balance | 860 |
| 6 | 4.7 | 1.8 | 3.8 | 2.6 | 0 | 0 | 0 | 0 | 0 | 0 | 0 | 0 | Balance | ~1000 |
| 7 | 20-23 | 0.5 | 0-0.5 | | 0.1 | | 8.0-10.0 | | 0.4 | 3.15-4.15 | 0.04 | 0.5 | Balance | 1290-1350 |
| 8 | 0 | 0 | 0 | 0 | 0 | 0 | 0 | 0 | 0 | 0 | 0 | 0 | 100 | 1455 |

Referring again to FIG. 2, once the powdered source materials (i.e., the powdered tungsten carbide and the powdered binder) are selected in block 201, the source materials are mixed together to form powdered mixture 127 in block 202. The selected source materials are preferably mixed such that they are evenly and uniformly distributed throughout the resulting mixture 127 (i.e., powdered mixture 127 is preferably a homogeneous or substantially homogeneous mixture of the selected source materials). Moving now to block 203, powdered mixture 127 is loaded into hopper(s) 125 of EBM machine 100. In addition, start plate 140 is positioned in build tank 130 according to block 204. As described above, start plate 140 is the base that defines the surface on which component 105 is built. In general, start plate 140 can be made of any suitable metal or non-metal. Examples of suitable metals that can be used to form start plate 140 include, without limitation, nickel, iron, cobalt, aluminum, copper, titanium, and alloys thereof. Examples of suitable non-metals that can be used to form start plat 140 include, without limitation, ceramics, ceramics-metal composites such as SiC—$Al_2O_3$, $Si_3N_4$-M (where M is a metal), and carbide-graphite composites. In embodiments described herein, the start plate 140 is preferably made of a non-magnetic metal, carbon steel, or alloy steel. For manufacturing earth-boring drill bits as described in more detail below, the start plate 140 is preferably made of carbon steel or alloy steel.

With hopper(s) 125 loaded with powdered mixture 127 and start plate 140 disposed in build tank 130, vacuum chamber 120 and electron beam column 110 of EBM machine 100 are evacuated in block 205. In embodiments described herein, cavity 122 and electron beam column 110 are preferably evacuated to a pressure less than $8 \times 10^{-6}$ mBar. It should be appreciated that the actual pressure within the electron beam column 110 and vacuum chamber 120 may vary slightly. As an added precaution, cavity 122 is preferably purged with an inert gas such as nitrogen gas ($N_2$) or helium gas (He) during or immediately after it is evacuated to remove any gas(es) in cavity 122 that may react with the powdered mixture 127 or any of its constituents.

Referring still to FIG. 2, moving now to block 206, the powdered mixture 127 is fed from hopper(s) 125 and a layer of the powdered mixture 127 is distributed on start plate 140 with device 126. As previously described, device 126 moves transversely across the top of build tank 130 to move powdered mixture 127 fed from hopper(s) across start plate 140. To facilitate consistent and uniform melting of the powdered mixture 127 with electron beam 112, each layer of the powdered mixture 127 distributed by device 126 preferably has a uniform and constant thickness. More specifically, in embodiments described herein, each layer of the powdered mixture 127 distributed by device 126 preferably has a uniform and constant thickness of 0.04 mm and 0.12 mm, and more preferably 0.06 mm and 0.10 mm.

Next, in block 207, electron beam column 110 generates electron beam 112 and controllably moves the focal spot 115 of beam 112 across the layer of the powdered mixture 127. The electron beam 112, via interface of the control system and a 3D CAD model of the component 105, selectively melts the desired contour and profile of the layer of the powdered mixture 127 on start plate 140. In particular, as the focal spot 115 continuously moves or sweeps linearly back-and-forth across the layer of the powdered mixture 127, the portion of the powdered mixture 127 struck by focal spot 115 and the portions of the layer immediately adjacent the focal spot 115 are melted, and subsequently cool and solidify as the focal spot 115 continues it movement to an adjacent region of the layer. As the focal spot 115 sweeps across the layer of the powdered mixture 127, successively adjacent portions of the layer are melted, cool, and solidify together, thereby controllably transitioning the layer of the powdered mixture 127 to a single, continuous, monolithic solid layer on start plate 140.

In general, the power delivered by the electron beam 112 to the focal spot 115, the width (or diameter) of the focal spot 115, the line scanning speed of the focal spot 115 (i.e., the speed at which the focal spot 115 is moved linearly back-and-forth across the layer of the powdered mixture 127), and the scanning interval of the focal spot 115 (i.e., the horizontal distance measured center-to-center between each laterally adjacent linear pass of the focal spot 115 across the layer of the powdered mixture 127) are selected so that sufficient thermal energy is generated at the interface of electron beam 112 and the powdered mixture 127 to selectively melt the layer of the powdered mixture 127 into a single continuous homogenous monolithic mass. In embodiments described herein, the power delivered by the electron beam 112 to the focal spot 115 is preferably 200 W to 3000 W, more preferably 800 W to 2500 W, and even more preferably 1500 W to 2000 W; the focal spot 115 preferably has a width (or diameter) of 0.1 mm to 0.2 mm, more preferably 0.12 mm to 0.18 mm, and even more preferably 0.14 mm to 0.16 mm; the line scanning speed of the focal spot 115 is preferably 5.0 mm/s to 30.0 mm/s, more preferably 10.0 mm/s to 25.0 mm/s, and even more preferably 15.0 mm/s to 20.0 mm/s; and the scanning interval of the focal spot 115 is preferably 0.07 mm to 0.18 mm, and more preferably 0.10 mm to 0.15 mm.

Referring still to FIG. 2, after formation of the first or base layer of component 105 on start plate 140, blocks 206, 207 are repeated to build component 105 layer by layer. As the focal spot 115 continuously moves or sweeps linearly back-and-forth across each successive layer of the powdered mixture 127, the portion of the powdered mixture 127 struck by focal spot 115, the portions of the layer immediately adjacent the focal spot 115, and the portion of the upper surface of the previously deposited layer below the focal spot 115 are melted, and subsequently cooled and solidified together as the focal spot 115 continues it movement to an adjacent region of the layer. As the focal spot 115 sweeps across each successive layer of the powdered mixture 127, successively adjacent portions of the layer are melted, cooled, and solidified together and with the previously deposited layer, thereby controllably transitioning the layer of the powdered mixture 127 and the previously deposited layer into a single-piece, continuous, monolithic solid mass.

In general, blocks 206, 207 are repeated until component 105 having the predetermined 3D shape is finished. The finished component 105 is a single-piece, continuous, monolithic solid mass having a uniform and homogenous composition throughout as defined by the composition of the powdered mixture 127. In other words, the metal matrix composite composition of component 105 is the same as the composition of the powdered mixture 127 previously described.

As will be described in more detail below, embodiments of the metal matrix composite compositions described herein exhibit a relatively high hardness, wear resistance, corrosion resistance, compression strength, compression fracture distortion rate, and flexural strength (also referred to as bend strength or fracture strength). More specifically, embodiments of the metal matrix composite compositions described herein exhibit a hardness greater than 50 HRA (76 to 87 HRA), wear resistance of 75 to 85 times that of 42CrMo steel, a corrosion resistance of 25 to 32 times that of 316 stainless steel, a compression strength greater than 1700 Mpa, a compression fracture distortion rate greater than 12%, and a flexural strength of 1200 MPa to 1400 MPa (~174 ksi to 203 ksi). Such physical properties offer the potential for improved strength, wear resistance, and corrosion resistance as compared to many conventional materials used to make components that experience impact loads, abrasive materials, corrosive fluids, or combinations thereof.

It should also be appreciated that embodiments of the metal matrix composite compositions described herein exhibit a homogeneous composition, uniform distribution of elements, and a uniform density throughout. These characteristics offer the potential for reduced susceptibility to cracking as compared to conventional metal matrix materials manufactured using conventional powder metallurgy techniques that often yield a less homogenous composition, non-uniform distribution of elements, and non-uniform density throughout. In addition, such characteristics (i.e., homogeneous composition, uniform distribution of elements, and a uniform density throughout) result in a relatively low composition micro-segregation and porosity. Still further, embodiments of additive manufacturing methods disclosed herein offer the potential to shorten the manufacturing cycle, reduce manufacturing costs, and improve the efficiency of the use of the source materials (i.e., reduce waste of the source materials) as compared to conventional powder metallurgy manufacturing techniques used to make metal matrix materials as embodiments described herein eliminate the steps of mold making, powder compacting, powder dispersion, sintering, infiltration, and precision machining.

In general, the embodiments of metal matrix composites compositions and manufacturing methods (e.g., method 200) disclosed herein can be used to make any type of component. As previously described, earth-boring drill bits, pump impellers, and elbows along fluid conduits may experience particularly problematic impact loads, abrasive materials, corrosive fluids, or combinations thereof. Over time, harsh operating conditions can leads to abrasive wear, erosion, corrosion, and damage to such components. In addition, many earth-boring drill bits, pump impellers, and fluid conduit elbows have relatively complex shapes that can be challenging to manufacture using conventional casting or molding methods. However, embodiments of metal matrix composites compositions and manufacturing methods disclosed herein offer the potential for earth-boring bits, pump impellers, and fluid conduit elbows with enhanced hardness, wear resistance, corrosion resistance, compression strength, compression fracture distortion rate, and flexural strength as compared to most conventional compositions and manufacturing methods. Such potential benefits may be achieved without the use of embedded inserts or the application of coatings. In addition, since embodiments of manufacturing methods described herein utilize EBM additive manufacturing techniques and do not use or rely on molds (e.g., pre-formed or pre-machined molds), such methods offer the potential to produce components having more complex shapes and geometries (e.g., structures with complex cavities, thin walled structures, etc.) than may be able to be made using most conventional manufacturing methods. Accordingly, the embodiments of metal matrix composites compositions and manufacturing methods disclosed herein may be particularly suitable for earth-boring drill bits, pump impellers, and fluid conduit elbows.

To further illustrate various illustrative embodiments of the present invention, the following examples are provided.

EXAMPLE 1

A 10 mm×10 mm×10 mm cube-shaped test sample made of a metal matrix composite composition comprising 65 wt % WC, 0.63 wt % B, 1.23 wt % Si, 29.6 wt % Ni, and less than 0.1 wt % other element(s), was made in accordance with an embodiment of an EBM additive manufacturing method disclosed herein. The wear resistance of the test sample was determined according to China standard MLS-225B, GB/T 12444 entitled "Metallic materials—Wear tests Block-on-Ring Wear Test," which utilizes a standard block-on-ring dry sliding friction test machine including a reference or standard comprising a 42CrMo steel ring.

The 42CrMo steel ring was quenched and tempered to a hardness of 53 HRC and rotated at a speed of 400 rev/min. The metal matrix composite sample was pressed against the rotating ring with a normal load of 20 Kgf for 60 minutes over a total sliding distance of 3800 m. For comparing the wear resistance of the metal matrix composite material to the 42CrMo steel, a relative wear resistance was define as follows:

$$\text{Relative wear resistance} = \frac{\text{Weight loss of the standard due to frictional wear}}{\text{Weight loss of the test sample due to frictional wear}}$$

In this case, the "standard" was the 42CrMo steel ring and the "test sample" was the metal matrix composite sample. The calculated relative wear resistance results indicated that the wear resistance of the metal matrix composite material was 60 to 85 times greater than the wear resistance of the 42CrMo steel.

EXAMPLE 2

A test sample made of a metal matrix composite composition comprising 72 wt % WC, 0.5 wt % B, 0.98 wt % Si, 26.42 wt % Ni, and less than 0.1 wt % other element(s) was made in accordance with an embodiment of an EBM additive manufacturing method disclosed herein. An immersed corrosion test was used to evaluate the corrosion resistance of the metal matrix composite test sample as compared to a reference or standard comprising a 316 stainless steel specimen.

The immersed corrosion test was carried out in 0.5 mol/L aqueous hydrochloric acid solution at 20° C. for 168 hours. For comparing the corrosion resistance of the metal matrix composite material to 316 stainless steel, a relative corrosion resistance was define as follows:

$$\text{Relative corrosion resistance} = \frac{\text{Weight loss of the standard due to corrosion}}{\text{Weight loss of the test sample due to corrosion}}$$

In this case, the "standard" was the 316 stainless steel specimen and the" test sample" was the metal matrix composite sample. The calculated relative corrosion resistance results indicated that the corrosion resistance of the metal matrix composite material was 25 to 32 times greater than the corrosion resistance of the 316 stainless steel.

EXAMPLE 3

Figure 3:
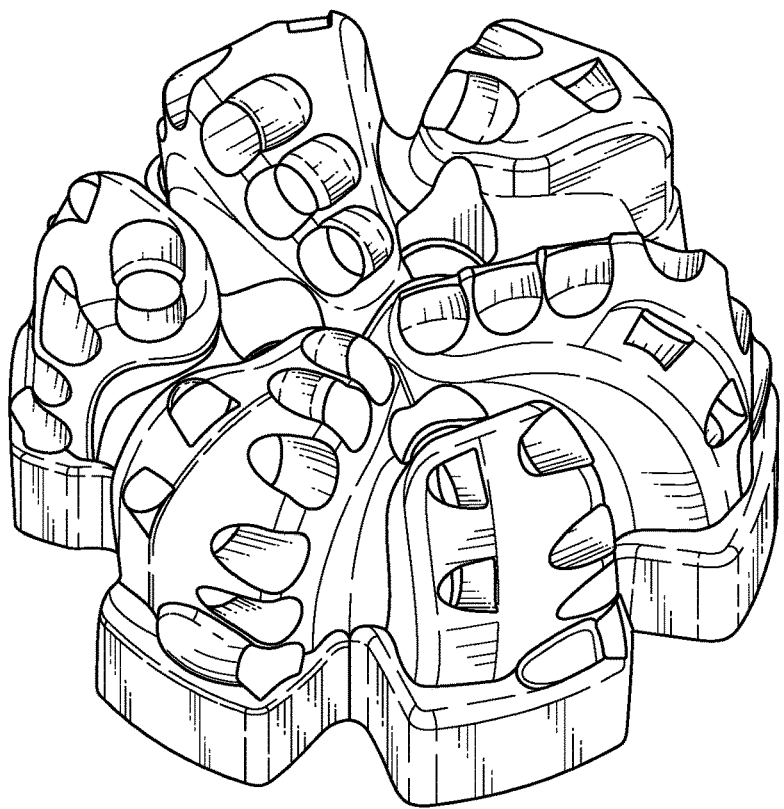
FIG. 3 is a perspective top view of an embodiment of an earth-boring drill bit manufactured in accordance Example 3.
Figure 4:
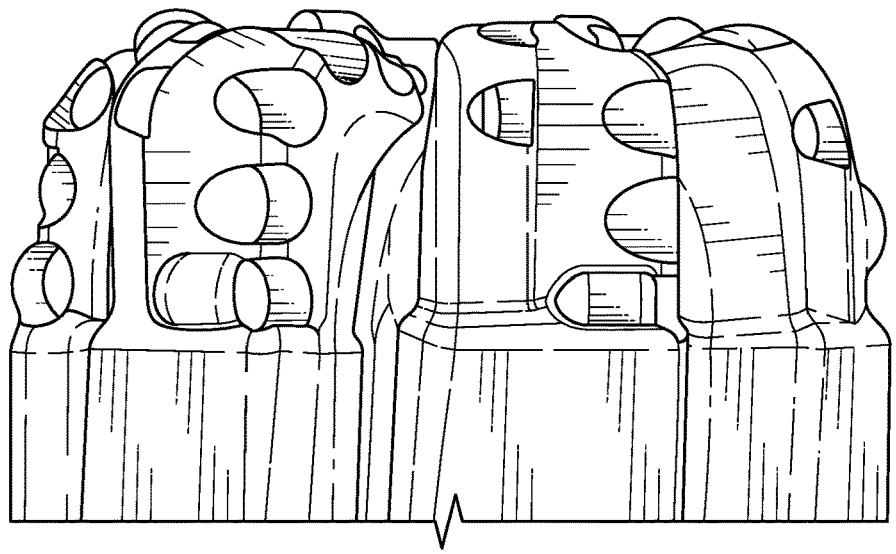
FIG. 4 is a partial side view of the drill bit of FIG. 3.
Figure 5:
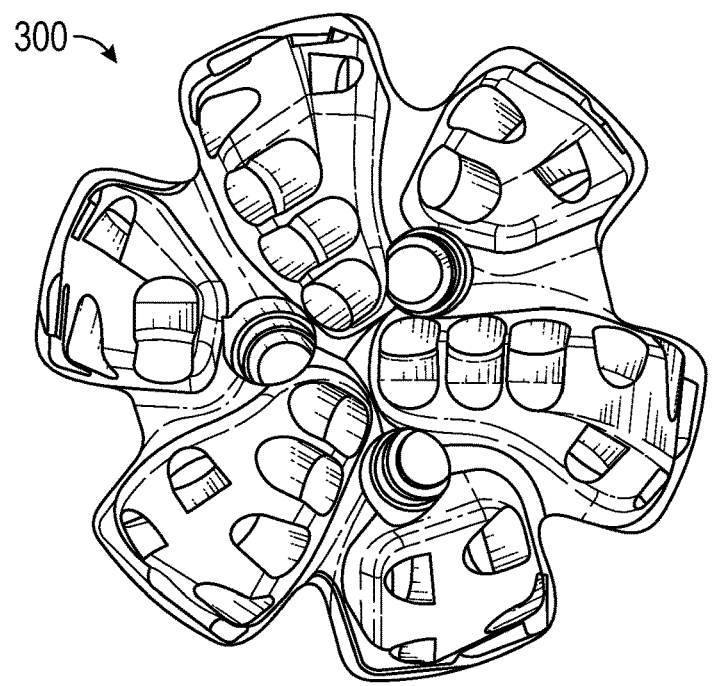
FIG. 5 is an end view of the drill bit of FIG. 3.

A homogenous powdered mixture comprising 65 wt % of 80 mesh powdered tungsten carbide and 35 wt % of 150 mesh powdered nickel-based binder was prepared and placed in an EBM machine. The nickel-based binder comprised 0.54 wt % B, 1.05 wt % Si, 33.4 wt % Ni, and less than 0.1 wt % other element(s). The vacuum chamber of EBM machine was evacuated to $8 \times 10^{-6}$ mBar and purged with nitrogen. Next, the powdered mixture was layered and selectively melted according to a 3D CAD model using an electron beam to additively manufacture an earth-boring drill bit 300 shown in FIGS. 3-5. The electron beam was delivered at a power of 1000 W to 1200 W, the width of the focal spot of the electron beam was 0.16 mm, the line scanning speed of the focal spot was 25 mm/s to 30 mm/s, the thickness of each layer of the powdered mixture was 0.1 mm, and the scanning interval of the electron beam was 0.1 mm. The drill bit 300 had a height of 82.37 mm and an outer diameter (or full gage diameter) of 82.37 mm.

The hardness, compression strength, compression fracture distortion rate, flexural strength, relative wear resistance, and relative corrosion resistance of the drill bit 300 were determined. In particular, the hardness was determined using a conventional Rockwell test, the compression strength and compression fracture distortion rate were determined in accordance with China standard GB/T7314-2005 entitled "Metallic Materials at Room Temperature Compression Test Method," the flexural strength was determined in accordance with China standard GB/T 6569-86 entitled "Engineering Ceramics Bending Strength Test Method," the relative wear resistance was determined according to the test procedure described above in Example 1, and the relative corrosion resistance was determined according to the test procedure described above in Example 2. The results were as follows: the hardness of the drill bit 300 was 78 HRA, the compression strength of the drill bit 300 was 1774 Mpa, the compression fracture distortion rate of the drill bit 300 was 14.3%, the flexural strength of the drill bit 300 was 1302 Mpa, the relative wear resistance of the drill bit 300 was 78.5 (i.e., 78.5 times greater than the wear resistance of the 42CrMo steel), and the relative corrosion resistance of the drill bit 300 was 28.4 (i.e., 28.4 times greater than the corrosion resistance of the 316 stainless steel).

As noted above, the hardness of the drill bit 300 made of an embodiment of a metal matrix composite composition disclosed herein and in accordance with an embodiment of an EBM additive manufacturing method disclosed herein was determined to be 78 HRA. For comparison purposes, a conventional matrix bit body was manufactured using conventional techniques (casting) and a powdered mixture comprising 70.0 wt % of 80.0 μm powdered tungsten carbide and 30.0 wt % of powdered copper based binder. The copper based binder comprised 53.0 wt % Cu, 23.0 wt % Mn, 15.0 wt % Ni, and 0.9 wt % Zn. The hardness of the conventional matrix bit body was determined to be 65-73 HRA.

As noted above the flexural strength of the drill bit 300 made of an embodiment of a metal matrix composite composition disclosed herein and in accordance with an embodiment of an EBM additive manufacturing method disclosed herein was determined to be 1,302 MPa (~189 Ksi). In contrast, most conventional matrix bit bodies exhibit a flexural strength of about 758-930 MPa (~110-135 Ksi).

EXAMPLE 4

Figure 6:
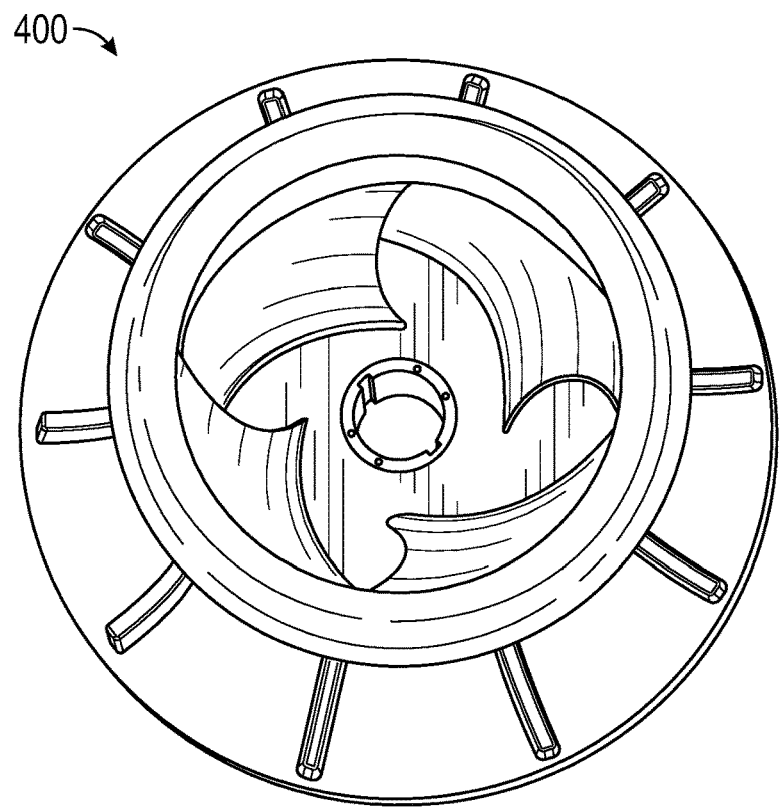
FIG. 6 is top view of an embodiment of a pump impeller manufactured in accordance with Example 4.
Figure 7:
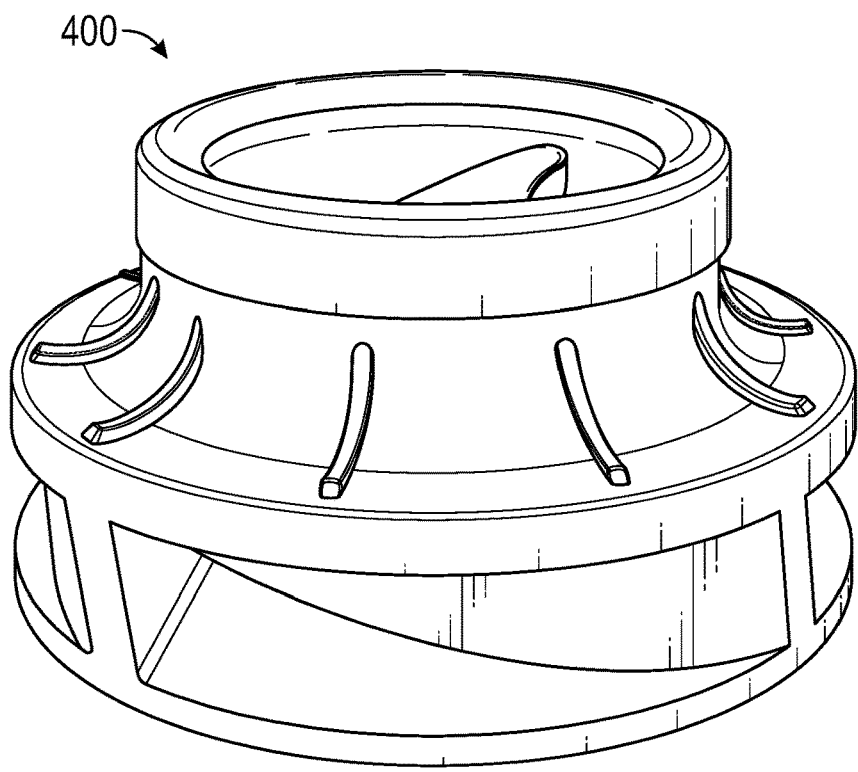
FIG. 7 is a side view of the pump impeller of FIG. 6.

A homogenous powdered mixture comprising 70 wt % of 80 mesh powdered tungsten carbide and 30 wt % of 150 mesh powdered nickel-based binder was prepared and placed in an EBM machine. The nickel-based binder comprised 1.8 wt % B, 3.5 wt % Si, 94.6 wt % Ni, and less than 0.1 wt % other element(s). The vacuum chamber of EBM machine was evacuated to $8\times10^{-6}$ mBar and purged with nitrogen. Next, the powdered mixture was layered and selectively melted according to a 3D CAD model using an electron beam to additively manufacture a pump impeller 400 shown in FIGS. 6 and 7. The electron beam was delivered at a power of 2000 W to 2200 W, the width of the focal spot of the electron beam was 0.20 mm, the line scanning speed of the focal spot was 15 mm/s to 20 mm/s, the thickness of each layer of the powdered mixture was 0.12 mm, and the scanning interval of the electron beam was 0.15 mm.

The hardness, compression strength, compression fracture distortion rate, flexural strength, relative wear resistance, and relative corrosion resistance of the pump impeller 400 were determined. In particular, the hardness was determined using a conventional Rockwell test, the compression strength and compression fracture distortion rate were determined in accordance with China standard GB/T7314-2005 entitled "Metallic Materials at Room Temperature Compression Test Method," the flexural strength/strength was determined in accordance with China standard GB/T 6569-86 entitled "Engineering Ceramics Bending Strength Test Method," the relative wear resistance was determined according to the test procedure described above in Example 1, and the relative corrosion resistance was determined according to the test procedure described above in Example 2. The results were as follows: the hardness of the pump impeller 400 was 85.5 HRA, the compression strength of the pump impeller 400 was 1833 Mpa, the compression fracture distortion rate of the pump impeller 400 was 15.1%, the flexural strength of the pump impeller 400 was 1267 Mpa, the relative wear resistance of the pump impeller 400 was 82.7 (i.e., 82.7 times greater than the wear resistance of the 42CrMo steel), and the relative corrosion resistance of the pump impeller 400 was 30.7 (i.e., 30.7 times greater than the corrosion resistance of the 316 stainless steel).

EXAMPLE 5

Figure 8:
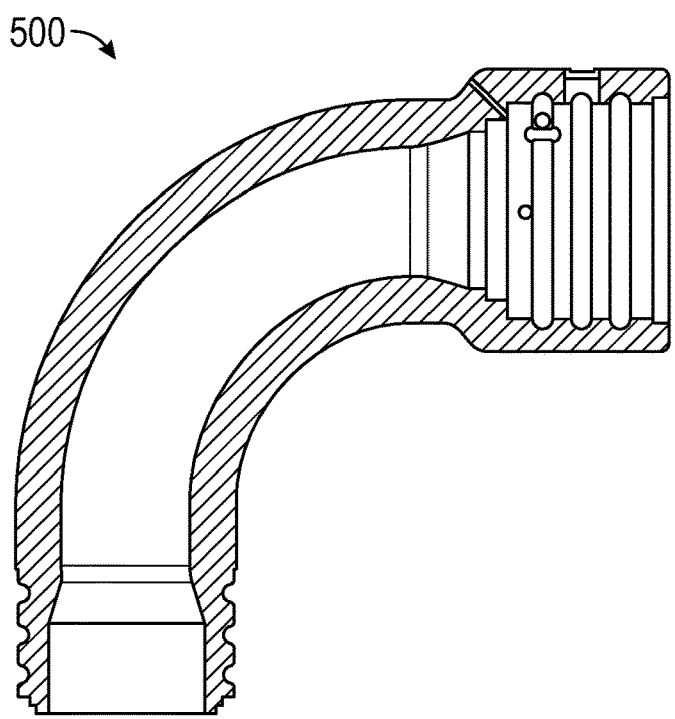
FIG. 8 is a schematic cross-sectional view of an embodiment of a fluid conduit elbow manufactured in accordance with Example 5.

A homogenous powdered mixture comprising 72 wt % of 80 mesh powdered tungsten carbide and 28 wt % of 150 mesh powdered nickel-based binder was prepared and placed in an EBM machine. The nickel-based binder comprised 1.8 wt % B, 3.5 wt % Si, 94.6 wt % Ni, and less than 0.1 wt % other element(s). The vacuum chamber of EBM machine was evacuated to $8\times10^{-6}$ mBar and purged with nitrogen. Next, the powdered mixture was layered and selectively melted according to a 3D CAD model using an electron beam to additively manufacture a fluid conduit elbow 500 shown in FIG. 8. The electron beam was delivered at a power of 1500 W to 1800 W, the width of the focal spot of the electron beam was 0.18 mm, the line scanning speed of the focal spot was 15 mm/s to 20 mm/s, the thickness of each layer of the powdered mixture was 0.10 mm, and the scanning interval of the electron beam was 0.15 mm.

The hardness, compression strength, compression fracture distortion rate, flexural strength, relative wear resistance, and relative corrosion resistance of the elbow 500 were determined. In particular, the hardness was determined using a conventional Rockwell test, the compression strength and compression fracture distortion rate were determined in accordance with China standard GB/T7314-2005 entitled "Metallic Materials at Room Temperature Compression Test Method," the flexural strength/strength was determined in accordance with China standard GB/T 6569-86 entitled "Engineering Ceramics Bending Strength Test Method," the relative wear resistance was determined according to the test procedure described above in Example 1, and the relative corrosion resistance was determined according to the test procedure described above in Example 2. The results were as follows: the hardness of the elbow 500 was 82.5 HRA, the compression strength of the elbow 500 was 1873 Mpa, the compression fracture distortion rate of the elbow 500 was 14.1%, the flexural strength of the elbow 500 was 1291 Mpa, the relative wear resistance of the elbow 500 was 77.4 (i.e., 77.4 times greater than the wear resistance of the 42CrMo steel), and the relative corrosion resistance of the elbow 500 was 28.2 (i.e., 28.2 times greater than the corrosion resistance of the 316 stainless steel).

EXAMPLE 6

A homogenous powdered mixture comprising 60 wt % of 100 mesh powdered tungsten carbide and 40 wt % of 125 mesh powdered nickel-based binder was prepared and placed in an EBM machine. The nickel-based binder was binder 5 in Table 1 above. Thus, the nickel-based binder comprised 1.0 wt % B, 2.5 wt % Si, 3.0 wt % Cr, 5.5 wt % Cu, 1.5 wt % Mo, 2.0 wt % P, and 84.5 wt % Ni. The vacuum chamber of EBM machine was evacuated to $8\times10^{-6}$ mBar and purged with helium. Next, the powdered mixture was layered and selectively melted according to a 3D CAD model using an electron beam to additively manufacture an earth-boring drill bit. The electron beam was delivered at a power of 920 W to 1100 W, the width of the focal spot of the electron beam was 0.14 mm, the line scanning speed of the focal spot was 28 mm/s to 35 mm/s, the thickness of each layer of the powdered mixture was 0.09 mm, and the scanning interval of the electron beam was 0.09 mm.

EXAMPLE 7

A homogenous powdered mixture comprising 55 wt % of 120 mesh powdered tungsten carbide and 45 wt % of 125 mesh powdered nickel-based binder was prepared and placed in an EBM machine. The nickel-based binder was binder 1 in Table 1 above. Thus, the nickel-based binder comprised 3.0 wt % B, 4.2 wt % Si, 7.0 wt % Cr, 3.0 wt % Fe, and 82.8 wt % Ni. The vacuum chamber of EBM machine was evacuated to $8 \times 10^{-6}$ mBar and purged with helium. Next, the powdered mixture was layered and selectively melted according to a 3D CAD model using an electron beam to additively manufacture an earth-boring drill bit. The electron beam was delivered at a power of 850 W to 1040 W, the width of the focal spot of the electron beam was 0.12 mm, the line scanning speed of the focal spot was 30 mm/s to 38 mm/s, the thickness of each layer of the powdered mixture was 0.09 mm, and the scanning interval of the electron beam was 0.10 mm.

EXAMPLE 8

A homogenous powdered mixture comprising 60 wt % of 100 mesh powdered tungsten carbide and 40 wt % of 125 mesh powdered nickel-based binder was prepared and placed in an EBM machine. The nickel-based binder was binder 2 in Table 1 above. Thus, the nickel-based binder comprised 3.0 wt % B, 4.5 wt % Si, and 92.5 wt % Ni. The vacuum chamber of EBM machine was evacuated to $8 \times 10^{-6}$ mBar and purged with helium. Next, the powdered mixture was layered and selectively melted according to a 3D CAD model using an electron beam to additively manufacture an earth-boring drill bit. The electron beam was delivered at a power of 900 W to 1050 W, the width of the focal spot of the electron beam was 0.13 mm, the line scanning speed of the focal spot was 32 mm/s to 40 mm/s, the thickness of each layer of the powdered mixture was 0.10 mm, and the scanning interval of the electron beam was 0.09 mm.

The hardness, compression strength, compression fracture distortion rate, flexural strength, relative wear resistance, and relative corrosion resistance of the drill bit were determined. In particular, the hardness was determined using a conventional Rockwell test, the compression strength and compression fracture distortion rate were determined in accordance with China standard GB/T7314-2005 entitled "Metallic Materials at Room Temperature Compression Test Method," the flexural strength was determined in accordance with China standard GB/T 6569-86 entitled "Engineering Ceramics Bending Strength Test Method," the relative wear resistance was determined according to the test procedure described above in Example 1, and the relative corrosion resistance was determined according to the test procedure described above in Example 2. The results were as follows: the hardness of the drill bit was 83.8 HRA, the compression strength of the drill bit was 1845 Mpa, the compression fracture distortion rate of the drill bit was 11.8%, the flexural strength of the drill bit was 1014 Mpa, the relative wear resistance of the drill bit was 61.4 (i.e., 61.4 times greater than the wear resistance of the 42CrMo steel), and the relative corrosion resistance of the drill bit was 42.1 (i.e., 42.1 times greater than the corrosion resistance of the 316 stainless steel).

EXAMPLE 9

A homogenous powdered mixture comprising 65 wt % of 60 mesh powdered tungsten carbide and 35 wt % of 80 mesh powdered nickel-based binder was prepared and placed in an EBM machine. The nickel-based binder was binder 4 in Table 1 above. Thus, the nickel-based binder comprised 2.8 wt % B, 3.5 wt % Si, 22.0 wt % Co, and 71.7 wt % Ni. The vacuum chamber of EBM machine was evacuated to $8 \times 10^{-6}$ mBar and purged with helium. Next, the powdered mixture was layered and selectively melted according to a 3D CAD model using an electron beam to additively manufacture an earth-boring drill bit. The electron beam was delivered at a power of 1200 W to 1500 W, the width of the focal spot of the electron beam was 0.10 mm, the line scanning speed of the focal spot was 20 mm/s to 25 mm/s, the thickness of each layer of the powdered mixture was 0.18 mm, and the scanning interval of the electron beam was 0.12 mm.

The hardness, compression strength, compression fracture distortion rate, flexural strength, relative wear resistance, and relative corrosion resistance of the drill bit were determined. In particular, the hardness was determined using a conventional Rockwell test, the compression strength and compression fracture distortion rate were determined in accordance with China standard GB/T7314-2005 entitled "Metallic Materials at Room Temperature Compression Test Method," the flexural strength was determined in accordance with China standard GB/T 6569-86 entitled "Engineering Ceramics Bending Strength Test Method," the relative wear resistance was determined according to the test procedure described above in Example 1, and the relative corrosion resistance was determined according to the test procedure described above in Example 2. The results were as follows: the hardness of the drill bit was 79.5 HRA, the compression strength of the drill bit was 1584 Mpa, the compression fracture distortion rate of the drill bit was 13.1%, the flexural strength of the drill bit was 1108 Mpa, the relative wear resistance of the drill bit was 70.4 (i.e., 70.4 times greater than the wear resistance of the 42CrMo steel), and the relative corrosion resistance of the drill bit was 33.2 (i.e., 33.2 times greater than the corrosion resistance of the 316 stainless steel).

EXAMPLE 10

A homogenous powdered mixture comprising 55 wt % of 120 mesh powdered tungsten carbide and 45 wt % of 125 mesh powdered nickel-based binder was prepared and placed in an EBM machine. The nickel-based binder was binder 3 in Table 1 above. Thus, the nickel-based binder comprised 1.8 wt % B, 3.5 wt % Si, and 94.7 wt % Ni. The vacuum chamber of EBM machine was evacuated to $8 \times 10^{-6}$ mBar and purged with helium. Next, the powdered mixture was layered on the surface of a 1018 carbon steel start plate and selectively melted according to a 3D CAD model using an electron beam to additively manufacture an earth-boring drill bit. The electron beam was delivered at a power of 850 W to 1040 W, the width of the focal spot of the electron beam was 0.12 mm, the line scanning speed of the focal spot was 30 mm/s to 38 mm/s, the thickness of each layer of the powdered mixture was 0.09 mm, and the scanning interval of the electron beam was 0.1 mm.

EXAMPLE 11

Two homogenous powdered mixtures were made having the following compositions: (1) 40 wt % of 60 mesh powdered tungsten carbide and 60 wt % of 80 mesh powdered nickel-based binder; and (2) 60 wt % of 60 mesh powdered tungsten carbide and 40 wt % of 80 mesh powdered nickel binder, with the nickel binder comprising 100 wt % Ni. The nickel-based binder in the powdered mixture (1) was binder 7 in Table 1 above, and the nickel binder in the powdered mixture (2) was binder 8 in Table 1 above. Thus, the nickel-based powdered binder in mixture (1) comprised 20.0-23.0 wt % Cr, 0.5 wt % Fe, 0-0.5 wt % Si, 0.1 wt % Co, 8.0-10.0 wt % Mo, 0.4 wt % Al, 3.15-4.15 wt % Nb, 0.04 wt % Ti, and the balance being Ni; and the nickel binder in mixture (2) comprised 100 wt % Ni.

Each powder mixture was prepared and separately placed in an EBM machine to additively manufacture an earth-boring drill bit. In each case, the vacuum chamber of EBM machine was evacuated to $8 \times 10^{-6}$ mBar and purged with helium, and the powder mixture was layered and selectively melted according to a 3D CAD model using an electron beam. Further, in each case, the electron beam was delivered at a power of 1200 W to 1500 W, the width of the focal spot of the electron beam was 0.10 mm, the line scanning speed of the focal spot was 20 mm/s to 25 mm/s, the thickness of each layer of the powdered mixture was 0.18 mm, and the scanning interval of the electron beam was 0.12 mm.

The hardness and flexural strength of each drill bit was determined. In particular, the hardness was determined using a conventional Rockwell test and the flexural strength was determined in accordance with China standard GB/T 6569-86 entitled "Engineering Ceramics Bending Strength Test Method." The results are shown in Table 2 below.

TABLE 2

| Powdered Mixture | Hardness (HRC) | Flexural Strength (Ksi) |
|---|---|---|
| (1) | 45-62 | 130-212 |
| (2) | 32-50 | 142-210 |

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. An additive manufacturing method for making a metal matrix composite component, the method comprising:
   (a) mixing a powdered tungsten carbide and a powdered binder to form a powdered mixture, wherein the powdered mixture comprises powdered tungsten carbide in an amount of 45 wt % to 72 wt % of the powdered mixture and a powdered binder in an amount of 28 wt % to 55 wt % of the powdered mixture, wherein the powdered tungsten carbide has a powder mesh size of 50 mesh to 400 mesh and the powdered binder has a powder mesh size of 60 mesh to 400 mesh, and wherein the powdered binder comprises:
   boron in an amount of 0.0 wt % to 6.0 wt % of the binder;
   silicon in an amount of 0.0 wt % to 6.0 wt % of the binder; and
   nickel in an amount of at least 70 wt % of the binder;
   (b) loading the powdered mixture into an electron beam melting (EBM) machine after (a);
   (c) evacuating a vacuum chamber within the EBM machine;
   (d) feeding the powdered mixture into the vacuum chamber to form a layer of the powdered mixture in the vacuum chamber after (b);
   (e) melting the layer of the powdered mixture in the vacuum chamber with an electron beam after (c) and (d);
   (f) repeating (d) and (e) to make the metal matrix composite component.

2. The method of claim 1, wherein the powdered binder comprises at least 99 wt % of boron, silicon, and nickel.

3. The method of claim 1, wherein the powdered binder comprises nickel in an amount of at least 90 wt % of the binder.

4. The method of claim 1, wherein the powdered tungsten carbide has a powder mesh size of 150 mesh to 350 mesh; wherein the powdered binder has a powder mesh size of 150 mesh to 350 mesh.

5. The method of claim 1, wherein (e) comprises:
   delivering the electron beam to a focal spot on the powdered mixture at a power of 200 W to 3000 W.

6. The method of claim 5, wherein the focal spot has a width of 0.1 mm to 0.2 mm.

7. The method of claim 6, wherein the power is 1500 W to 2000 W; and
   wherein the width of the focal spot is 0.14 mm to 0.16 mm.

8. The method of claim 1, wherein (e) comprises passing the focal spot linearly back-and-forth across the powdered mixture at a scanning interval of 0.07 mm to 0.18 mm.

9. The method of claim 1, wherein (d) comprises distributing the layer of the powered mixture in the vacuum chamber at a uniform thickness of 0.04 mm to 0.12 mm.

10. The method of claim 5, wherein (c) comprises evacuating the vacuum chamber to a pressure less than $8 \times 10^{-6}$ mBar after placing the powered mixture in the vacuum chamber.

11. The method of claim 1, wherein the metal matrix composite component is an earth-boring drill bit, a pump impeller, or an elbow for a fluid conduit.

12. The method of claim 1, wherein the binder comprises at least 99 wt % of nickel.

13. The method of claim 1, wherein the binder comprises 0.0 wt % of Si and 0.0 wt % B.

14. The method of claim 13, wherein the binder comprises at least 99 wt % of Ni.

15. The method of claim 1, wherein the binder comprises chromium, molybdenum, and niobium.

16. The method of claim 15, wherein the binder comprises:
   chromium in an amount of 20.0 to 23.0 wt % of the binder;

molybdenum in an amount of 8.0 to 10.0 wt % of the binder; and niobium in an amount of 3.15 to 4.15 wt % of the binder.

17. The method of claim 16, wherein the binder further comprises:
   iron;
   silicon in an amount of 0.0 to 0.5 wt % of the binder;
   cobalt;
   aluminum;
   titanium; and
   manganese.

18. The additive manufacturing method of claim 1, wherein the powdered binder comprises boron and silicon.

19. The additive manufacturing method of claim 18, wherein the powdered binder comprises:
   boron in an amount of 0.5 wt % to 6.0 wt % of the binder; and
   silicon in an amount of 2.0 wt % to 6.0 wt % of the binder.

20. The additive manufacturing method of claim 19, wherein the powdered binder comprises:
   boron in an amount of 1.0 wt % to 3.0 wt % of the binder; and
   silicon in an amount of 2.5 wt % to 4.5 wt % of the binder.

* * * * *